United States Patent
Sasaki (10) Patent No.: US 8,295,429 B2
(45) Date of Patent: Oct. 23, 2012

(54) DISCARDING UNNECESSARY CHARGE IN A CCD COLOR IMAGE SENSOR

(75) Inventor: Atsushi Sasaki, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 1005 days.

(21) Appl. No.: 11/607,248

(22) Filed: Nov. 30, 2006

(65) Prior Publication Data

US 2007/0127089 A1    Jun. 7, 2007

(30) Foreign Application Priority Data

Dec. 1, 2005    (JP) ................................. 2005-347769

(51) Int. Cl.
*H03K 23/46*    (2006.01)
*G11C 19/28*    (2006.01)

(52) U.S. Cl. ........................................... 377/63; 377/62
(58) Field of Classification Search ............... 377/58–63
See application file for complete search history.

(56) References Cited

U.S. PATENT DOCUMENTS

| | | | |
|---|---|---|---|
| 4,612,454 A * | 9/1986 | Kinoshita et al. ............. | 327/342 |
| 4,800,591 A * | 1/1989 | Sato .............................. | 382/270 |
| 7,009,740 B2 | 3/2006 | Sakai | |
| 2005/0155502 A1* | 7/2005 | Shigeta ......................... | 101/170 |

FOREIGN PATENT DOCUMENTS

| | | |
|---|---|---|
| JP | 05-137072 | 6/1993 |
| JP | 08-336077 | 12/1996 |
| JP | 2002-44373 | 2/2002 |
| JP | 2003-060843 A | 2/2003 |
| JP | 2003-163788 | 6/2003 |

* cited by examiner

*Primary Examiner* — Benny Q Tieu
*Assistant Examiner* — Eric A Rust
(74) *Attorney, Agent, or Firm* — Nutter McClennen & Fish LLP; John J. Penny, Jr.; Christina M. Sperry (57) ABSTRACT

A CCD color image sensor which prevents unnecessary charge from overflowing in a photoelectric conversion element. An image input apparatus having the CCD color image sensor comprises transferring unit which transfers effective charge accumulated in the photoelectric conversion element provided for each of the colors (R, G and B), extracted as an output signal, to a shift register by opening a shift gate; and discarding unit which discards unnecessary charge accumulated in the photoelectric conversion element by opening the shift gate at different timing from one color to another immediately before the photoelectric conversion element starts accumulating effective charge again. The discarding unit discards unnecessary charge immediately before effective charge accumulates, and discards unnecessary charge by opening the shift gate before unnecessary charge overflows in the photoelectric conversion element.

10 Claims, 9 Drawing Sheets

--PRIOR ART--

FIG. 9

--PRIOR ART--

DISCARDING UNNECESSARY CHARGE IN A CCD COLOR IMAGE SENSOR

The entire disclosure of Japanese Patent Application No. 2005-347769 filed Dec. 1, 2005 is expressly incorporated by reference herein.

BACKGROUND OF THE INVENTION

The present invention relates to an image input apparatus having a CCD color image sensor.

Figure 3:
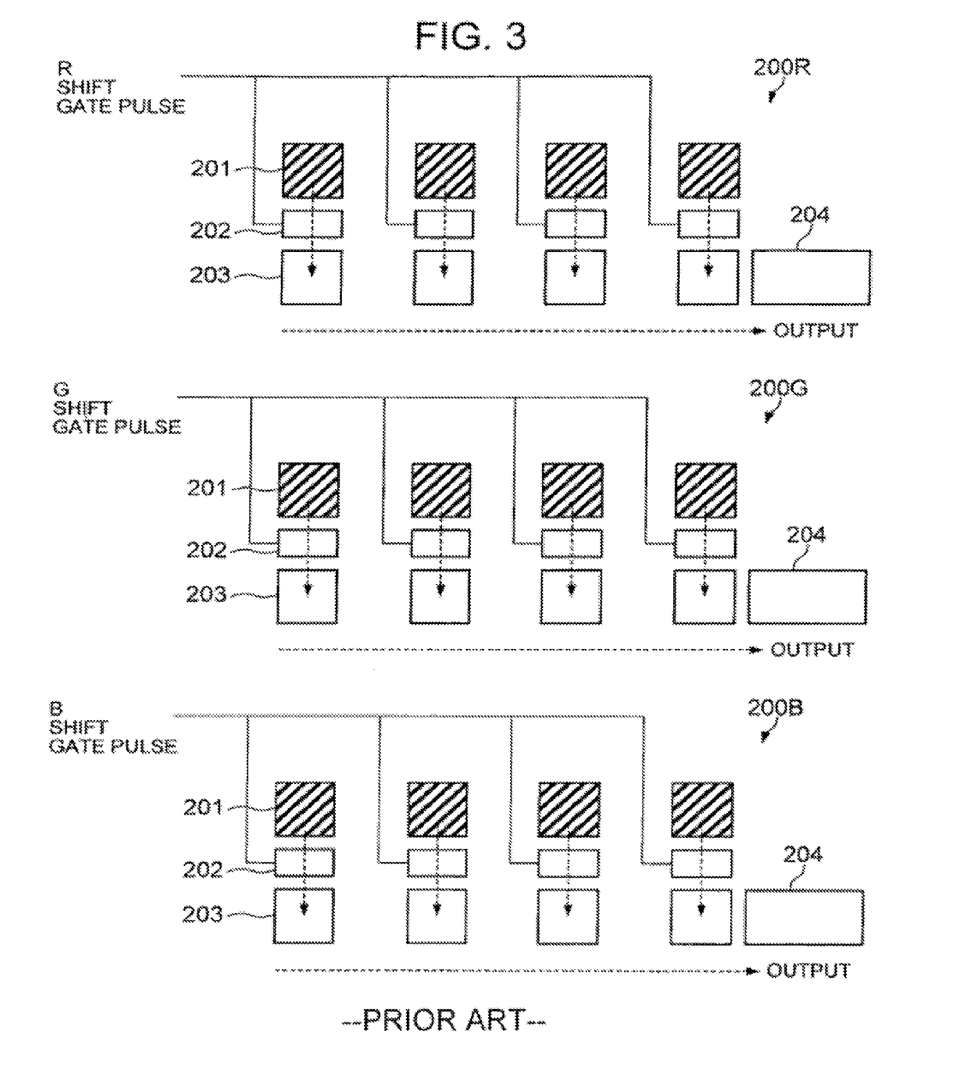
FIG. 3 is a schematic diagram of a CCD color image sensor.

JP-A-2003-163788 discloses an image input apparatus having a CCD color image sensor as an image device. The CCD color image sensor has, for each of the three primary colors: R (Red), G (Green) and B (Blue), plural photoelectric conversion elements 201 and shift registers 203 (FIG. 3). A photoelectric conversion element 201 has filters of the prescribed colors R, G and B. The photoelectric conversion element 201 receives light passed through the filter, and accumulates charge in accordance with the quantity of the received light. The charge accumulated in the photoelectric conversion element 201 is transferred to a shift register 203 by opening (enabling) a shift gate 202. The shift register 203 transfers the transferred charge to an output unit 204 using a charge-coupled device.

Such an image input apparatus having a CCD color image sensor (for example, an image scanner or a copying machine) reads an image recorded on a light-transmissive sheet such as a negative or positive film (hereinafter, referred to as a "transmissive original"), and an image recorded on a light-reflective sheet such as a printing or photographic paper (hereinafter, referred to as a "reflective original").

Figure 8:
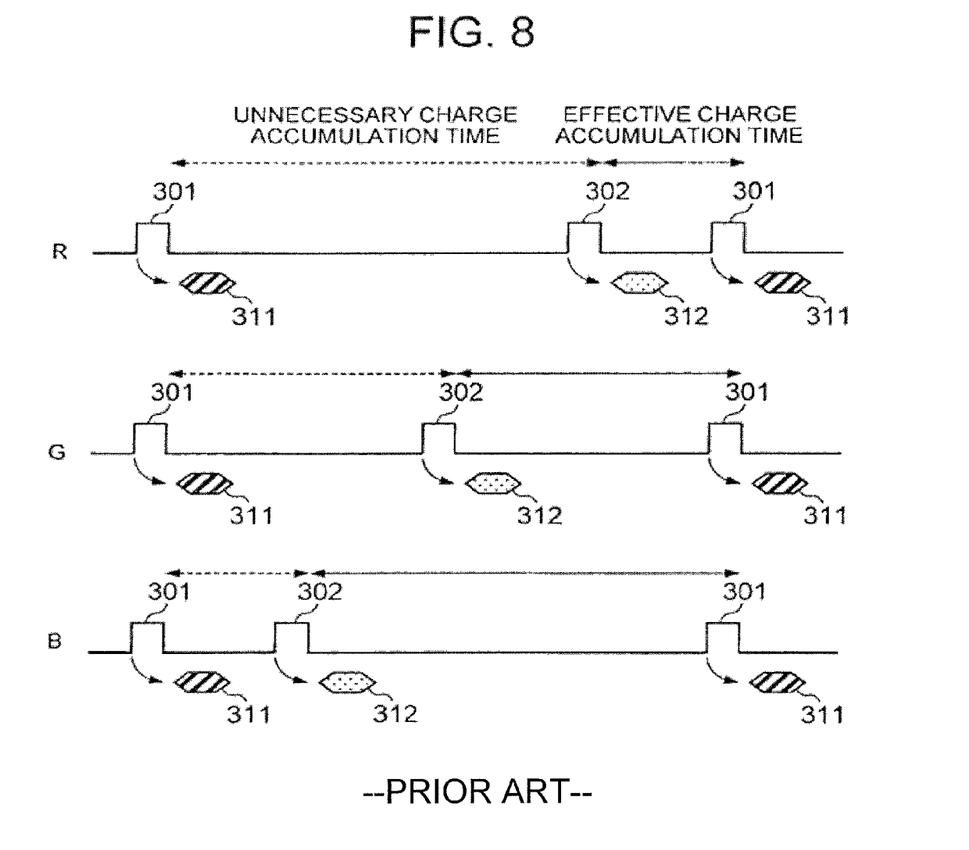
FIG. 8 is a timing diagram of a shift gate pulse in a conventional example.

A description is hereinafter given for a case in which a transmissive original such as a negative film is read. FIG. 8 is a timing diagram of pulses applied to open each shift gate 202 corresponding to each color of R, G and B (referred to as a "shift gate pulse"). To each shift gate 202, a shift gate pulse 301 is applied periodically so as to transfer charge to be extracted as an output signal 311 (referred to as "effective charge").

The three primary colors are not equal in light transmission with a negative film, but in the order of B<G<R. Accordingly, accumulation time of the effective charge 311 is adjusted so as to be in the order of B>G>R. Timing of starting accumulation of the effective charge 311 is also set in the order of B, G and R so that the incident light quantities of the three primary colors are nearly equal. Specifically, a shift gate pulse 302 for discarding the charge accumulated before accumulating the effective charge 311 (referred to as an "unnecessary charge") 312 is applied at different times in the order of B, G and R. This allows the accumulation time of the effective charge 311 to be adjusted in the order of B>G>R, thereby equalizing their incident light quantities.

Figure 9:
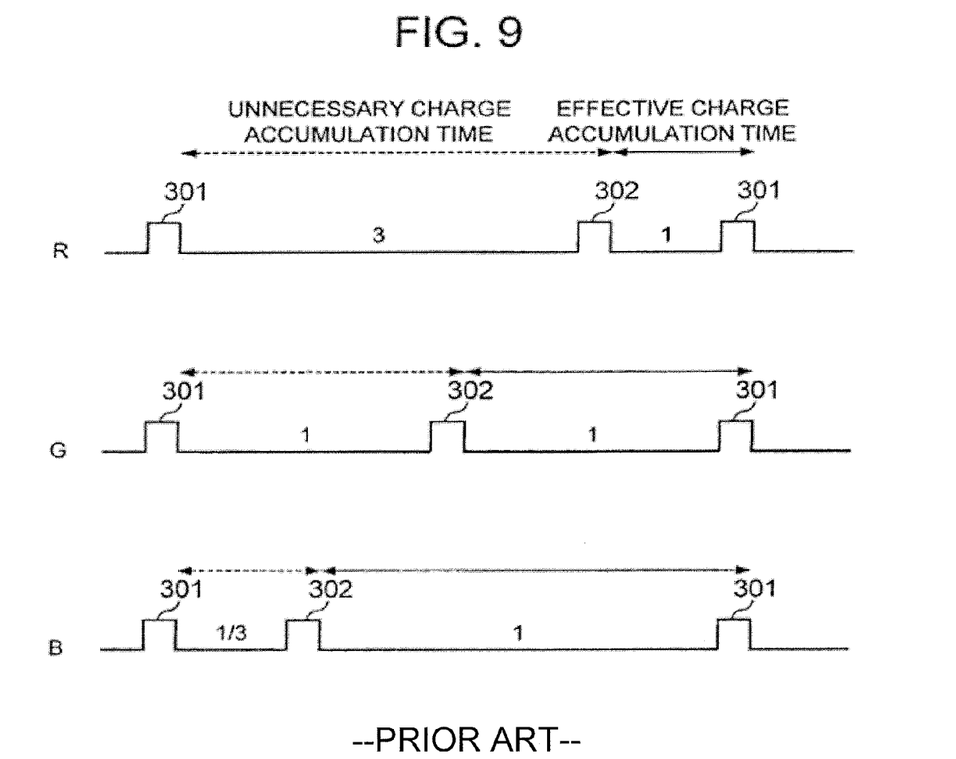
FIG. 9 shows timing of a shift gate pulse and a quantity of accumulated charge in a conventional example.

When a shift gate pulse is applied with the timing shown in FIG. 8, however, unnecessary charge sometimes overflows in the photoelectric conversion element 201. FIG. 9 shows the quantity of the accumulated charge in the photoelectric conversion element 201 when a shift gate pulse is applied with the timing shown in FIG. 8. Note that a negative film to be read is assumed to contain the three primary colors in nearly equal proportions. As has been mentioned above, since the accumulation time of the effective charge 311 is adjusted thereby almost equalizing the incident light quantities, R, G and B have the same quantity of the accumulated effective charge (shown as "1" in FIG. 9). On the other hand, the quantity of the accumulated unnecessary charge 312 follows the order of R>G>B due to the influence of accumulation time and transmission ("3", "1", "⅓", respectively in FIG. 9). This means that R has the largest quantity of accumulated unnecessary charge, with the fear that charge overflows if the quantity of the accumulated unnecessary charge exceeds the tolerable quantity of the charge accumulated in the photoelectric conversion element 201. If the tolerable quantity of the charge accumulated in the photoelectric conversion element 201 is less than 3 in FIG. 9, charge overflows. The charge overflowing in the photoelectric conversion element 201 has an influence on another pixel, causing smear.

SUMMARY OF THE INVENTION

The present invention has been achieved in order to overcome the above drawback, and it is an object of the present invention to prevent unnecessary charge from overflowing in a photoelectric conversion element in a CCD color image sensor.

To attain the above object, a first aspect of the present invention is an image input apparatus having a CCD color image sensor comprising: transferring unit which transfers effective charge accumulated in a photoelectric conversion element, extracted as an output signal, to a shift register by opening a shift gate; and discarding unit which transfers unnecessary charge accumulated in the photoelectric conversion element to the shift register so as to discard the unnecessary charge by opening the shift gate immediately before the photoelectric conversion element starts accumulating the effective charge again, wherein the discarding unit further discards the unnecessary charge by opening the shift gate before the unnecessary charge overflows in the photoelectric conversion element.

The timing of discarding the unnecessary charge immediately before accumulating the effective charge differs from one filter color of the photoelectric conversion element to another.

The unnecessary charge discarded for the first time after the effective charge is transferred to the shift register is preferably after the effective charge is output from the shift register.

After the unnecessary charge is discarded, if unnecessary charge is further discarded, the next discarding is preferably performed after the previously discarded unnecessary charge is output from the shift register.

An interval, after unnecessary charge is discarded, in cases in which unnecessary charge is further discarded, is preferably shorter than a time period until unnecessary charge is discarded for the first time after effective charge has been transferred to the shift register.

The discarding unit determines the number of times and timing of discarding the unnecessary charge using the time period until charge overflows in the photoelectric conversion element and the time period until charge output from the shift register is complete.

A second aspect of the present invention is an image input apparatus having a CCD color image sensor, transmitting the following control signals to a shift gate for controlling the transfer of charge from a photoelectric conversion element to a shift register: a first control signal for transferring effective charge accumulated in the photoelectric conversion element, extracted as an output signal, to the shift register; a second control signal for transferring the unnecessary charge to the shift register after the effective charge is transferred and before the unnecessary charge accumulated in the photoelectric conversion element overflows; and a third control signal for transferring the unnecessary charge accumulated in the photoelectric conversion element to the shift register immediately before the photoelectric conversion element starts accumulating effective charge again.

DESCRIPTION OF THE PREFERRED EMBODIMENT

Hereinafter, a description is given for one embodiment of the present invention.

Figure 1:
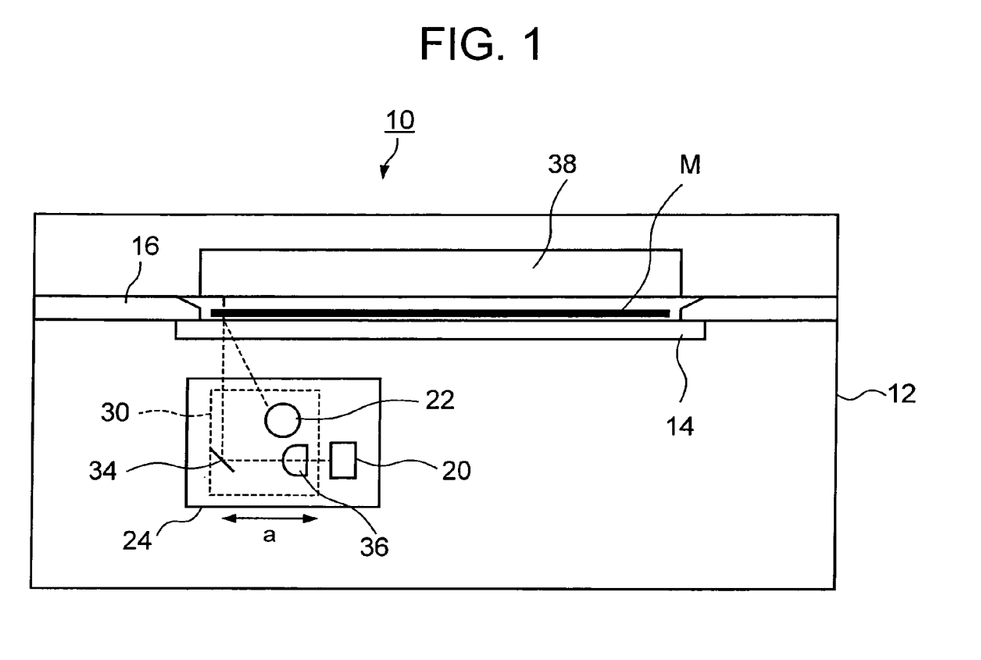
FIG. 1 is a schematic diagram of an image scanner.

FIG. 1 is a schematic diagram of an image scanner 10 as one example of an image input apparatus of the present invention.

The image scanner 10 is the so-called flatbed image scanner having a table for placing an original 14 on a casing 12.

The table 14 is made from a transparent plate such as a glass plate, and an original M is placed on the table. On the periphery of the table 14, a guide for an original 16 is provided so as to position the original M on the table 14.

An optical system 30 includes a light source for transmissive original 38, a light source for reflective original 22, a mirror 34, and a condenser lens 36. The light source for transmissive original 38 is the so-called surface light source. The light source for the reflective original 22, which includes a tube light source such as a fluorescent tube, is mounted on the carriage 24, extending in a main scanning direction. As shown by the chain line, the transmitted light image of the transmissive original M, irradiated with the light source for transmissive original 38 and the reflected light image of the reflective original M, irradiated with the light source for the reflective original 22 are formed on a CCD color image sensor 20 by a mirror 34, a condenser lens 36.

The CCD color image sensor 20 accumulates the charge obtained by converting the received light photoelectrically for a predetermined time and outputs an electric signal based on the quantity of the received light. In this embodiment, for the CCD color image sensor 20, a linear image sensor of a lens reduction system is employed, but a linear image sensor or area image sensor of a contact optical system may also be employed.

In the CCD color image sensor 20, a plurality of photoelectric conversion elements 201 is mounted on the carriage 24 arranged linearly in the direction vertical to the paper surface of the drawing in FIG. 1. The main scanning direction is a direction parallel to the photoelectric conversion elements 201.

The carriage 24 is accommodated in the casing 12 reciprocatably parallel to the glass surface of the original table 14. The carriage 24 includes the optical system 30 and the CCD color image sensor 20. The carriage 24 is slidably engaged with a guiding shaft parallel to the glass surface of the original table 14. The longitudinal axis of the guiding shaft extends in the direction of a. The carriage 24 is pulled by a belt or the like so that the CCD color image sensor 20 and the optical system 30 are transferred in the direction of a.

Figure 2:
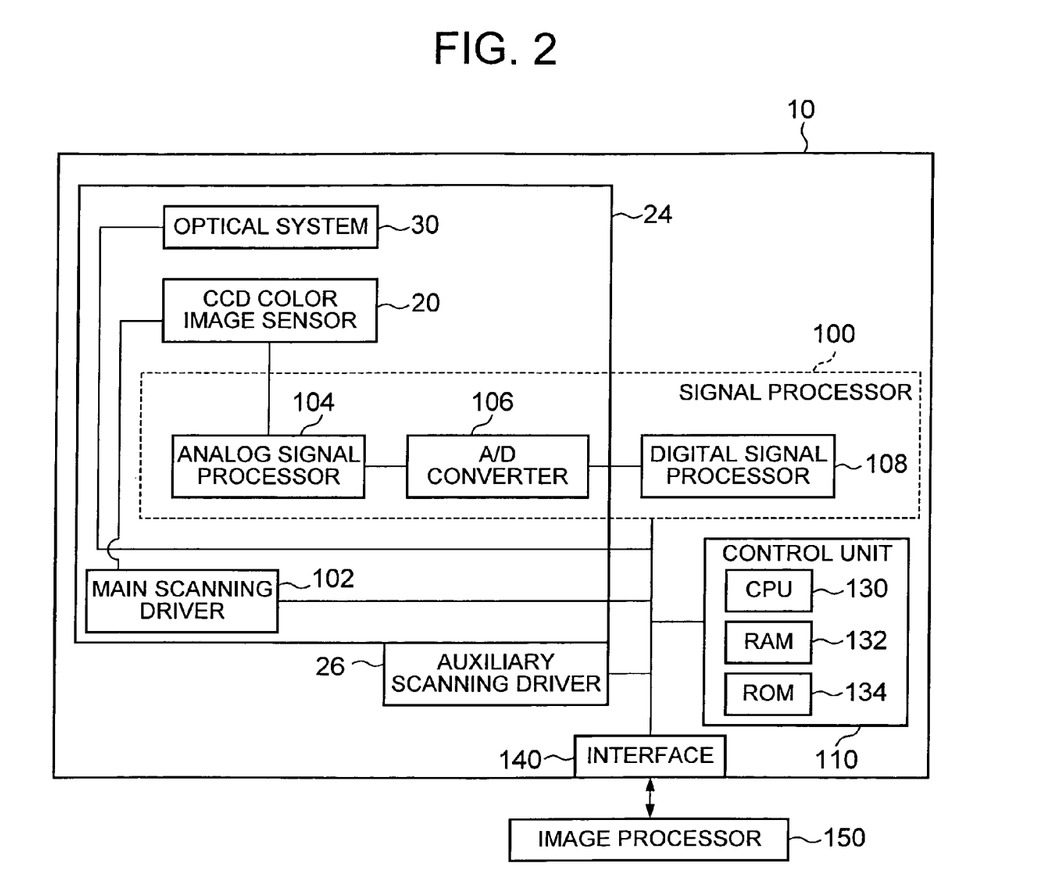
FIG. 2 is a functional block diagram of the image scanner.

FIG. 2 is a functional block diagram of the image scanner 10. A main scanning driver 102 produces pulses required for driving the CCD color image sensor 20 and then outputs the pulses to the CCD color image sensor 20. The main scanning driver 102 includes a synchronizing signal generator and a timing generator for driving.

An auxiliary scanning driver 26 includes a belt engaged with the carriage 24, a motor for rotating the belt, a gear train and a drive circuit. The auxiliary scanning driver 26 pulls the carriage 24 with the belt, thereby transferring the main scanning line extending vertically to the paper surface of the drawing in FIG. 1 in the a-direction, vertical thereto, so that scanning of a two-dimensional image becomes possible.

A signal processor 100 includes an analog signal processor 104, an A/D converter 106 and a digital signal processor 108. The analog signal processor 104 performs analog signal processing including amplification and noise reduction on an analog electric signal output from the CCD color image sensor 20, and then outputs the processed signal to the A/D converter 106. The A/D converter 106 quantizes the analog electric signal output from the analog signal processor 104 into a digital image signal of a predetermined gradation, and then outputs the image signal to the digital signal processor 108. The digital signal processor 108 performs processing including shading compensation, gamma correction and pixel interpolation on the image signal output from the A/D converter 106, and then generates image data to be transferred to an image processor 150. The various processing methods provided by the digital signal processor 108 may be replaced by processing performed by the computer program executed in a control unit 110 or the image processor 150.

The control unit 110, which includes a microcomputer having a CPU 130, a RAM 132 and a ROM 134, is connected to a drive circuit of the light sources 38, 22, the main scanning driver 102, the auxiliary scanning driver 26, and a signal processor 100, through a bus. The control unit 110 executes the computer program stored in the ROM 134 under the direction of the image processor 150, so as to control the light sources 38, 22, the main scanning driver 102, the auxiliary scanning driver 26 and the signal processor 100.

The image scanner 10 includes an interface 140 connected to the control unit 110 through a bus in addition to the elements mentioned above. To the interface 140, the image processor 150 of a personal computer or the like may be connected. The control unit 110 transfers an image data output from the signal processor 100 to the image processor 150 through the interface 140.

FIG. 3 is a schematic diagram showing a structure of the CCD color image sensor 20. The CCD color image sensor 20 has three sensors 200R, 200G and 200B linearly extending, juxtaposed to one another, on a single chip. Each of the sensors 200R, 200G and 200B has on-chip filter arrays of R (Red), G (Green) and B (Blue).

Each of the sensors 200R, 200G and 200B of the CCD color image sensor 20 includes a plurality of photoelectric conversion elements 201, shift gates 202, shift registers 203, and an output unit 204.

The plurality of photoelectric conversion elements 201 is arranged linearly in the extended direction of each of the sensors 200R, 200G and 200B. Each of the photoelectric conversion elements 201 has a color filter on the light-receptive surface, composed of a filter array of any one of R, G and B. Each of the photoelectric conversion elements 201, including a photodiode, receives light passed through the color filter, generates charge by photoelectrical conversion in accordance with the quantity of the received light, and accumulates the charge for a predetermined time.

The shift gate 202 controls whether the charge generated in the photoelectric conversion element 201 is transferred to the shift register 203, or accumulated in the photoelectric conversion element 201. The shift gate 202 extends parallel to the main scanning direction along the line of the photoelectric conversion elements 201. To the shift gate 202, shift gate pulses are applied by the main scanning driver 102. A potential gradient is formed when the shift gate pulses are applied, thereby opening the shift gate 202. The shift gate 202 then transfers the charge generated in the photoelectric conversion element 201 to the shift register 203. When no shift gate pulses are applied, the shift gate 202 is closed (disabled), thereby accumulating the charge generated in the photoelectric conversion element 201 in the photoelectric conversion element 201.

The shift register 203 transfers the charge transferred through the shift gate 202, generated in the photoelectric conversion element 201, to the output unit 204. The shift register 203 extends parallel to the main scanning direction, adjacent to the shift gate 202. To a plurality of electrodes of the shift register 203, drive pulses may be applied by the main scanning driver 102. The shift register 203 transfers charge in response to application of the drive pulses. The transfer direction of the charge corresponds to the extended direction of the shift register 203.

The output unit 204 converts the charge transferred from the shift register 203 into an electric signal, and then outputs the signal. The output unit 204 is provided at a side end of the shift register 203 in the direction of charge transfer. In response to the pulses applied from the main scanning driver 102, charge is transferred to the output unit 204 from the shift register 203, and the output unit 204 outputs an electric signal according to the charge to the signal processor 100. The output unit 204 determines whether or not a signal is to be extracted in the signal processor 100 as an image signal. Effective charge (signal charge) is the charge which becomes a signal selected to be an image signal, whereas unnecessary charge is the charge which becomes a signal not selected as an image signal.

Next, a description is given for the method by which the main scanning driver 102 drives the CCD color image sensor 20. Hereinafter, a case in which a transmissive original such as a negative film is read is described.

In this embodiment, in order to prevent unnecessary charge from overflowing in the photoelectric conversion element 201, shift gate pulses are applied to the shift gate 202 so as to discard unnecessary charge before unnecessary charge overflows.

Figure 4:
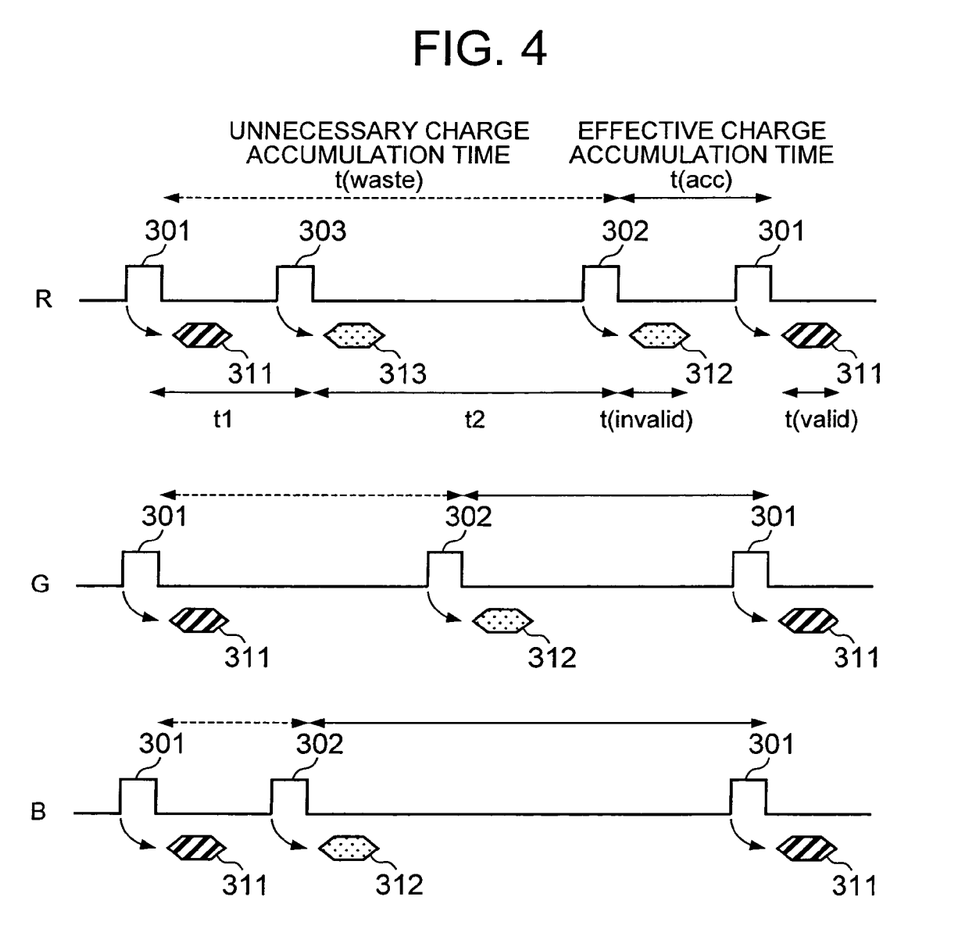
FIG. 4 is a timing diagram of shift gate pulses.

FIG. 4 is a timing diagram of shift gate pulses applied to the sensors 200R, 200G and 200B.

As has been described above, the main scanning driver 102 applies a shift gate pulse 301 periodically to each of the shift gates 202 of R, G and B so as to transfer an effective charge 311. The main scanning driver 102 applies the shift gate pulse 301 to each of the shift gates 202 of R, G and B at the same timing. The effective charge 311 accumulated in each photoelectric conversion element 201 by the shift gate pulse 301 is transferred to the shift register 203. The charge transferred to the shift register 203, corresponding to one line, is transferred to the output unit 204 by a CCD.

As has been described above, the three primary colors are not equal in transmitting a negative film, but in the order of B<G<R. Accordingly, in order to equalize the incident light quantities, the main scanning driver 102 applies a shift gate pulse 302 for discarding an accumulated unnecessary charge 312 according to each color of R, G and B at a predetermined timing before the effective charge 311 accumulates.

Furthermore, in order to prevent unnecessary charge from overflowing in the photoelectric conversion element 201, the main scanning driver 102 applies a shift gate pulse 303 for discarding unnecessary charge before the shift gate pulse 302. Specifically, the main scanning driver 102 applies the shift gate pulse 303 for discarding an unnecessary charge 313, to the shift gate 202 of the photoelectric conversion element 201 in which charge might overflow, apart from the shift gate pulse 302 for discarding the unnecessary charge 312 applied immediately before the effective charge 311 starts accumulating.

Since the photoelectric conversion element 201 corresponding to the color of R has a longer accumulation time of unnecessary charge and a higher transmission, most unnecessary charge accumulates therein. Therefore, a description is given for a case in which the shift gate pulse 303 is applied to the sensor 200R corresponding to the color of R.

Considering the charge transfer time by a CCD, the interval between shift gate pulses has to be longer than the charge reading time of one line. In addition, the interval between shift gate pulses has to be shorter than the longest charge accumulation time $\alpha$ in the photoelectric conversion element 201. The longest charge accumulation time $\alpha$ means a time that elapses before accumulated charge overflows, which is obtained from the tolerable quantity of accumulated charge and incident light quantity in the photoelectric conversion element 201.

Figure 5:
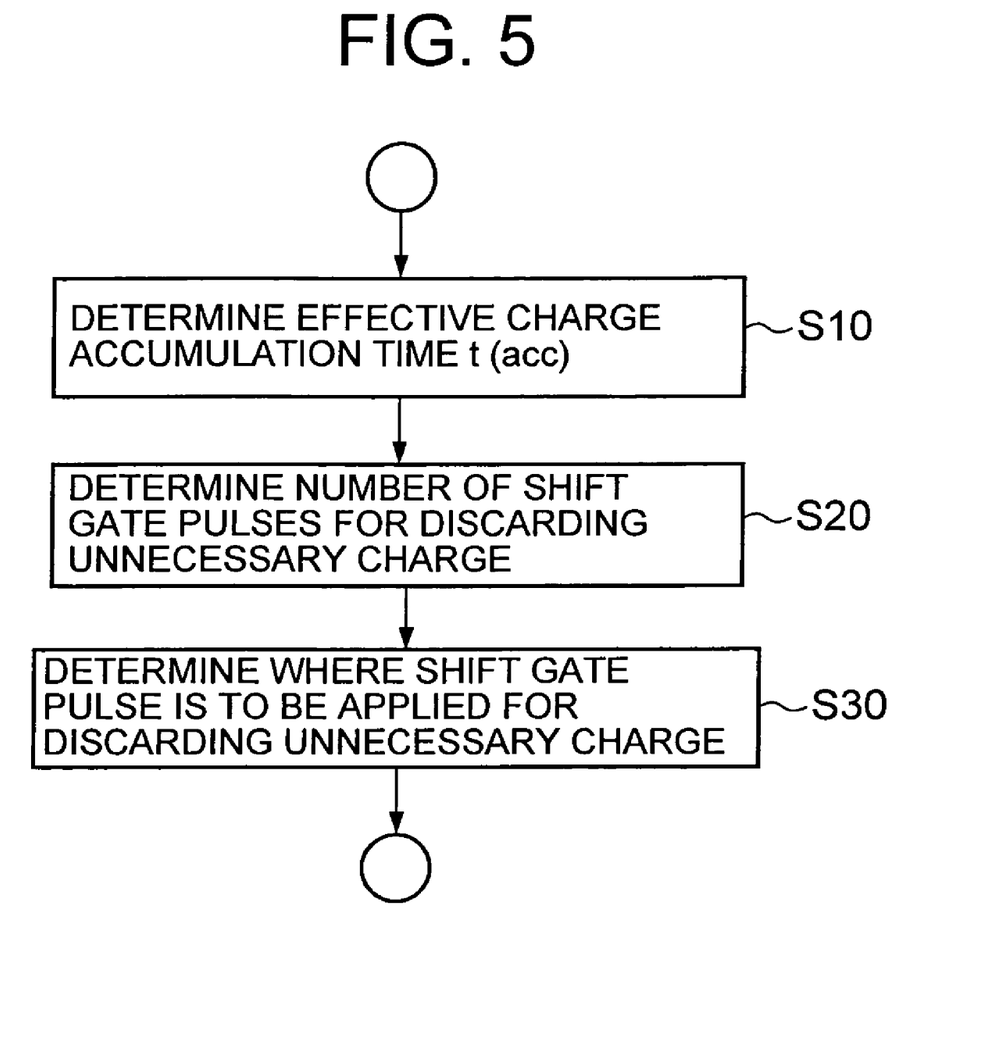
FIG. 5 is a flow chart showing a process of determining number of times and timing of applying a shift gate pulse.

Referring now to FIG. 5, a description is given for the method of determining the number of times of shift gate pulses applied for discarding unnecessary charge and the timing thereof so as to meet such requirements.

The main scanning driver 102 sets an adequate accumulation time t (acc) of effective charge for each color (S10). The adequate accumulation time t (acc) of effective charge is preset so that the respective colors have almost the same quantity of light incident on the photoelectric conversion element 201.

Next, the main scanning driver 102 determines the number of times of applying shift gate pulses for discarding unnecessary charge (S20). Specifically, an unnecessary charge accumulation time t (waste) is divided by the longest charge accumulation time $\alpha$ of the photoelectric conversion element 201; the answer is rounded up; and the result is then defined as the application number of times n. The unnecessary charge accumulation time t (waste) is obtained by subtracting the effective charge accumulation time t (acc) from the interval of the shift gate pulses 301 for transferring periodically applied effective charge.

The main scanning driver 102 then determines application timing of a shift gate pulse for discarding unnecessary charge (S30).

Referring to the timing diagram for R in FIG. 4, a description is given for a case in which the shift gate pulse 303 is applied only once for the prevention of charge overflow.

The variables have the following meanings:

t1: accumulation time of the first unnecessary charge 313 divided by the shift gate pulse 303;

t2: accumulation time of the second unnecessary charge 312 divided by the shift gate pulse 303;

t (invalid): unnecessary charge reading (discarding) time corresponding to one line; and t (valid): effective charge reading (transferring) time corresponding to one line.

The interval t1 between the shift gate pulse 301 for transferring effective charge and the shift gate pulse 303 for discarding unnecessary charge has to be longer than the effective charge transfer time t (valid).

The interval t2 between the shift gate pulse 303 for discarding unnecessary charge and the next shift gate pulse 302 for discarding unnecessary charge has to be longer than the unnecessary charge discarding time t (invalid).

Accordingly, the following requirements have to be met: $t1 \geq t$ (valid) and $t2 \geq t$ (invalid).

The interval between the shift gate pulses 301, 303 and 302 has to be shorter than the longest charge accumulation time $\alpha$ of the photoelectric conversion element 201. Therefore, the following requirements have to be met: $t1 \leq \alpha$ and $t2 \leq \alpha$.

The main scanning driver 102 determines the application timing of the shift gate pulse 303 so as to satisfy these equations.

Specifically, the time after applying the shift gate pulse 301 for transferring effective charge until applying the first shift gate pulse 303 for the first time is longer than the effective charge transferring time t (valid). The interval between the shift gate pulses 302 and 303 for discarding unnecessary charge is longer than the unnecessary charge discarding time t (invalid).

The above description has been given considering that the unnecessary charge reading (discarding) time t (invalid) and the effective charge reading (transferring) time t (valid) are sometimes different in length. This is because the sampling of signal output is not required for reading (discarding) unnecessary charge, unlike reading effective charge, which allows high-speed processing. Specifically, if unnecessary charge is discarded at a high speed, the following equation is established: t(invalid)<t(valid).

In such a case, the shortest requirement of t2 can be relaxed. Specifically, the t2 time can be reduced.

Figure 6:
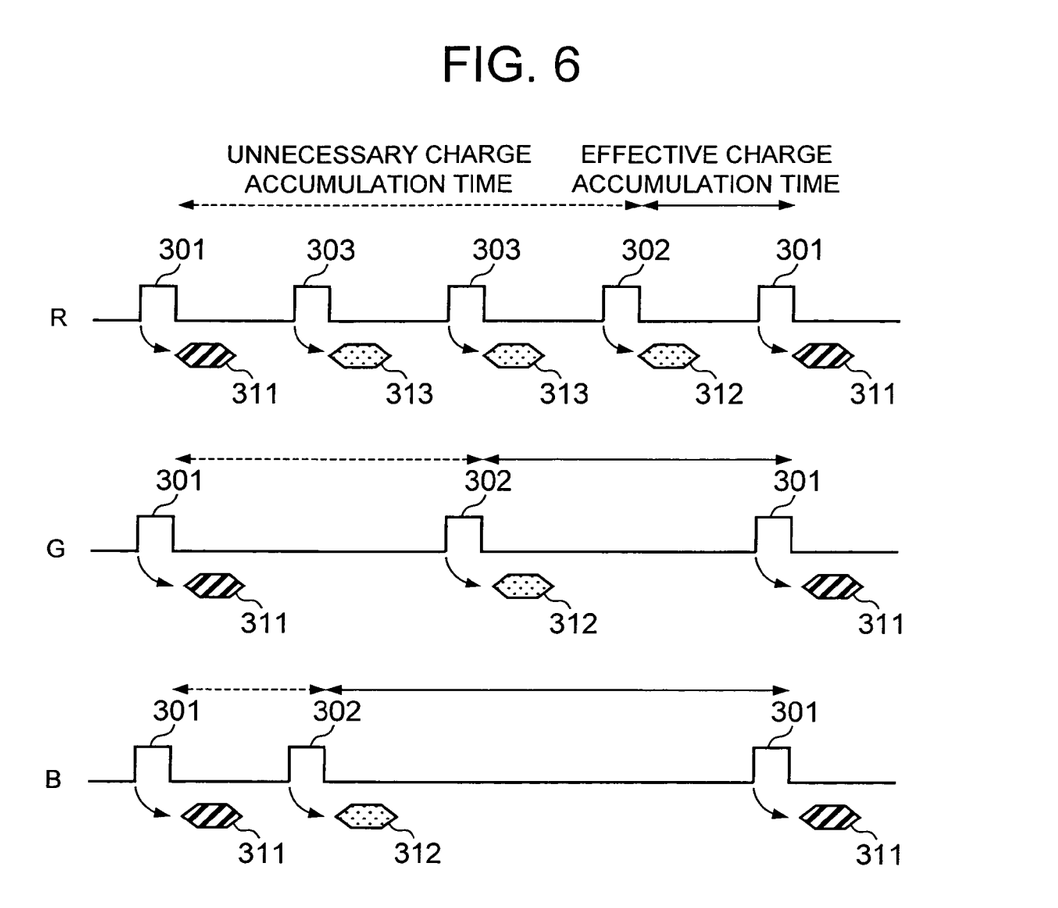
FIG. 6 is a timing diagram of the shift gate pulse.

FIG. 6 shows an example in which two shift gate pulses 303 for discarding unnecessary charge are added to the R shift gate 201 in order to prevent charge from overflowing.

Figure 7:
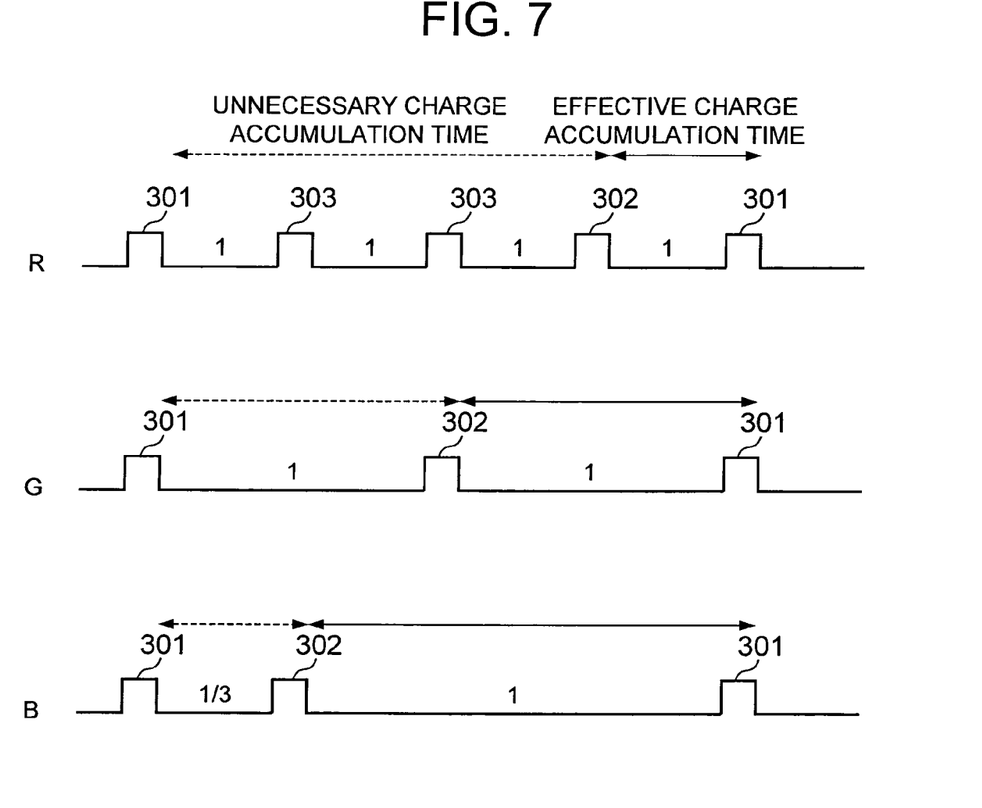
FIG. 7 shows timing of the shift gate pulse and quantity of accumulated charge.

FIG. 7, as in FIG. 6, shows a quantity of charge accumulated in the photoelectric conversion element 201 when a shift gate pulse is applied. Assume that the tolerable quantity of charge accumulated in the photoelectric conversion element 201 is "2".

As shown in the figure, even in R, which has the longest unnecessary charge accumulation time and higher transmission, the unnecessary charges 313 and 312 are discarded by the shift gate pulses 303 and 302 before being accumulated beyond "1", thereby preventing charge from overflowing.

Above, the embodiment of the present invention has been described.

According to the above embodiment, in a CCD color image sensor, charge is prevented from overflowing in a photoelectric conversion element, thereby preventing smear and the like from occurring.

The present invention is not limited to the above embodiment. Various modifications may be made to the above embodiment within the spirit and scope of the present invention.

The above embodiment relates to cases in which shift gate pulses for discarding unnecessary charge are added to R. For the other colors (G and B), if there is a possibility that charge might overflow, shift gate pulses for discarding unnecessary charge may be added.

Although the above embodiment relates to cases in which a transmissive original is read, the present invention may be applied to cases in which a reflective original is read. For a reflective original, shift gate pulses for discarding unnecessary charge may be added to the B shift gate 202 which has a longer unnecessary charge accumulation time.

Furthermore, the present invention is not limited to a CCD color image sensor for reading the three primary colors (RGB). The present invention is also applicable to a CCD color image sensor for reading YMC colors.

What is claimed is:

1. An image input apparatus having a CCD color image sensor, comprising:
   a transferring unit that transfers effective charge accumulated in a photoelectric conversion element corresponding to one color to a shift register corresponding to the one color by opening a shift gate corresponding to the one color at a first timing for the one color; and
   a discarding unit that transfers unnecessary charge accumulated in the photoelectric conversion element, to the shift register so as to discard the unnecessary charge, by opening the shift gate at a second timing for the one color immediately before the first timing without the shift gate being opened after the second timing until the shift gate is opened at the first timing, and the photoelectric conversion element starts accumulating the effective charge, wherein
   the discarding unit further discards the unnecessary charge by opening the shift gate at one or more third timings for the one color that come after a previous transfer of effective charge from the photoelectric conversion element and immediately before the second timing without the shift gate being opened after the third timings until the shift gate is opened at the second timing, such that the third timings come before the unnecessary charge overflows in the photoelectric conversion element, and
   an interval between each of the timings is shorter than a time taken until the charge accumulated in the photoelectric conversion element starts overflowing,
   wherein, the discarding unit further discards the unnecessary charge by opening the shift gate at two or more third timings, and
   an interval between the second timing and a last of a third timings and an interval between one of the third timings and a next one of the third timings are shorter than an interval between the first timing and a first of the third timings.

2. The image input apparatus according to claim 1, wherein the second timing differs from one filter color of the photoelectric conversion element to another.

3. The image input apparatus according to claim 1, wherein a first of the one or more of the third timings comes after the effective charge is output from the shift register.

4. The image input apparatus according to claim 1, wherein the second timing and the one or more third timings come after the previously discarded unnecessary charge is output from the shift register.

5. The image input apparatus according to claim 1, wherein the discarding unit determines a number of times and timing of discarding the unnecessary charge, using a time period until charge overflows in the photoelectric conversion element and a time period until charge output from the shift register is complete.

6. The image input apparatus according to claim 1, wherein the one color is selected from the group consisting of Red, Green, and Blue.

7. The image input apparatus according to claim 1, wherein the one color is selected from the group consisting of Yellow, Magenta, and Cyan.

8. An image input apparatus having a CCD color image sensor, wherein the following control signals are transmitted to a shift gate corresponding to one color for controlling charge transfer from a photoelectric conversion element corresponding to the one color to a shift register corresponding to the one color:

a first control signal for the one color for transferring effective charge accumulated in the photoelectric conversion element to the shift register;

a second control signal for the one color for transferring unnecessary charge accumulated in the photoelectric conversion element, to the shift register immediately before an accumulation of effective charge transferred by said first control signal is started without a control signal for the one color being transmitted to the shift gate after the second control signal until the first control signal is transmitted to the shift gate; and     one or more third control signals for the one color for further transferring the unnecessary charge accumulated in the photoelectric conversion element to the shift register after a previous transfer of effective charge from the photoelectric element immediately before the second control signal, and before unnecessary charge accumulated in the photoelectric conversion element overflows, without a control signal for the one color being transmitted to the shift gate after the third control signals until the second control signal is transmitted to the shift gate, wherein an interval between each of the control signals is shorter than a time taken until the charge accumulated in the photoelectric conversion element starts overflowing,     wherein, the discarding unit further discards the unnecessary charge by opening the shift gate at two or more third timings, and     an interval between the second timing and the last of the third timings and an interval between one of the third timings and a next one of the third timings are shorter than an interval between the first timing and a first of the third timings.

9. The image input apparatus according to claim 8, wherein the one color is selected from the group consisting of Red, Green, and Blue.

10. The image input apparatus according to claim 8, wherein the one color is selected from the group consisting of Yellow, Magenta, and Cyan.

\* \* \* \* \*